United States Patent
Cho et al.

(10) Patent No.: US 8,218,489 B2
(45) Date of Patent: Jul. 10, 2012

(54) APPARATUS FOR SCHEDULING TRANSMISSION OF DATA UNIT IN BASE STATION

(75) Inventors: Yun Hee Cho, Daejeon (KR); Hyung Jin Kim, Daejeon (KR); Ji Yeon Kim, Daejeon (KR); Gweon Do Jo, Daejeon (KR); Jin Up Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 813 days.

(21) Appl. No.: 12/329,424

(22) Filed: Dec. 5, 2008

(65) Prior Publication Data

US 2009/0147747 A1 Jun. 11, 2009

(30) Foreign Application Priority Data

Dec. 6, 2007 (KR) .................. 10-2007-0125954

(51) Int. Cl.
*H04W 4/00* (2009.01)
*H04W 72/00* (2009.01)
*H04L 12/56* (2006.01)
*H04L 1/18* (2006.01)

(52) U.S. Cl. ... 370/329; 370/338; 370/341; 370/395.21; 455/452.2; 714/748

(58) Field of Classification Search .......... 370/328–350; 455/63.1–72, 450–453, 500–516; 714/748–751, 714/790, 822
See application file for complete search history.

(56) References Cited

U.S. PATENT DOCUMENTS

| 7,230,937 B2 * | 6/2007 | Chi et al. ................. 370/329 |
| 7,385,951 B2 * | 6/2008 | Balachandran et al. ..... 370/329 |
| 7,509,554 B2 * | 3/2009 | Lohr et al. ................ 714/748 |
| 7,515,616 B2 * | 4/2009 | Yi et al. ................. 370/252 |
| 7,619,985 B2 * | 11/2009 | Yi et al. ................. 370/252 |
| 2003/0142656 A1 | 7/2003 | Padovani et al. |
| 2007/0280168 A1 * | 12/2007 | Shibata ................. 370/331 |
| 2008/0186915 A1 * | 8/2008 | Kim et al. ............... 370/329 |
| 2010/0202420 A1 * | 8/2010 | Jersenius et al. ......... 370/337 |
| 2010/0226316 A1 * | 9/2010 | Terry et al. ............. 370/328 |

FOREIGN PATENT DOCUMENTS

| KR | 2002-0092841 A | 12/2002 |
| KR | 2005-0118599 A | 12/2005 |
| KR | 2006-0023706 | 3/2006 |
| WO | WO-02/07372 A2 | 1/2002 |

* cited by examiner

*Primary Examiner* — Tri H Phan

(74) *Attorney, Agent, or Firm* — Rabin & Berdo, P.C.

(57) ABSTRACT

The present invention relates to a scheduling apparatus of a base station supporting Automatic Repeat reQuest (ARQ) method. In particular, the present invention discloses scheduling a data unit transmitted to a mobile station from a base station providing ARQ method for correcting an error in wireless data communication and generating a high rate frame.

According to the present invention, there is provided a transmission controlling apparatus comprising a receiver to receive mobile station status information from a mobile station connected with a base station, a schedule managing unit to determine transmission priority of a plurality of data units to be transmitted to the mobile station based on the received mobile station status information, and a transmitter to transmit the data units to the mobile station based on the determined transmission priority.

4 Claims, 10 Drawing Sheets

APPARATUS FOR SCHEDULING TRANSMISSION OF DATA UNIT IN BASE STATION

CROSS-REFERENCE TO RELATED APPLICATION

This application claims priority from Korean Patent Application No. 10-2007-0125954, filed on Dec. 6, 2007, in the Korean Intellectual Property Office, the entire disclosure of which is incorporated herein by reference.

BACKGROUND OF THE INVENTION

1. Field of the Invention

The present invention relates to a scheduling apparatus of a base station supporting an Automatic Repeat reQuest (ARQ) method. In particular, disclosed is a scheduling apparatus for scheduling a data unit transmitted from an MAC that is a base station providing the ARQ method for correcting an error in wireless data communication and generating a high rate frame. The present invention is derived from work as a part of a new driving force of core IT technology development work performed in at the Ministry of Information and Communication and The Institute for Information Technology Advancement [Ref. No. 2006-S-001-02, title: adaptive wireless access and transmission technique for 4G mobile communication system].

2. Description of Related Art

Research is vigorously performed to provide a variety of Quality of Service (QoS) having more than 100 Mbps transmission rate in the $4^{th}$ generation communication system that is a next-generation communication system. In order to accomplish this, a mobile communication system evolves into a form of Broadband Wireless Access (BWA) such as a Local Area Network (LAN) system and a Metropolitan Area Network (MAN) system, plus guaranteeing mobility and QoS.

An error may occur in specific data in wireless data communication according to wireless channel status.

Methods for controlling an error occurring from loss or damage of a frame during data transmission in wireless environment are a stop-and-wait ARQ method, go-back-N-continuous ARQ method, selective-repeat continuous ARQ method, and the like. Further, a hybrid ARQ method is recently used.

According to the stop-and-wait ARQ method, a transmitter waits for an Acknowledgement (ACK) message after transmitting a single frame, a receiver transmits an ACK message only upon successively receiving a frame and transmits a Negative Acknowledgement (NACK) message when error occurs in the frame. When a receiver fails to receive a frame due to destruction of the frame, the receiver does not transmit any signal and a transmitter retransmits when a signal is not received within a predetermined time. Thus, the stop-and-wait ARQ method has an advantage that it is easily realized but has a disadvantage that transmission efficiency declines as waiting time increases.

Also, according to the go-back-N-continuous ARQ method, a transmitter transmits a series of frames with a fixed window-size and a receiver does not receive the series of frames when an error is detected from at least one frame in the series of frames and transmit NACK message. The transmitter retransmits all frames after the NACK message.

Also, according to the selective-repeat continuous ARQ method modified from the go-back-N-continuous ARQ method that retransmits only the frame that receives the NACK, it has good transmission efficiency, but overhead may occur from a memory space for storing a next frame until a frame where an error occurs is retransmitted. Specifically, according to the selective-repeat continuous ARQ, error checking result (e.g., CRC result) for packets received in a receiver should be feedback to a transmitter. First of all, a transmitter performs initial transmission of a packet and a receiver decodes a received packet. In this case, when an error does not occurs, ACK signal is transmitted to the transmitter. Conversely, when an error occurs, NACK signal is transmitted to the transmitter. The transmitter either retransmits a previous packet or transmits a new packet according to ACK/NACK signal from the receiver.

Generally, scheduling is performed in consideration of channel environment of a mobile station and priority of service. However, when a retransmission packet exists, the retransmission packet must be scheduled to be sent firstly among the packet having the same priority. When retransmission of a retransmission packet is delayed, a timeout may occur and other packets related to the corresponding packet may be discarded. When initial transmission is delayed, it appears as service delay, but when retransmission is delayed, it causes the discard of a packet and appears as service cut off. However, when initial transmission having high-priority competes with retransmission having low-priority under a condition that priority of each service is completely different, a system may fall into a dilemma for determining that one should be firstly transmitted. If scheduling is performed according to priority and if data having high-priority are in a rush in a specific time period, a packet having low-priority may not be retransmitted continuously, so that other packets related to the retransmission packet may be at risk of being discard.

SUMMARY OF THE INVENTION

An aspect of the present invention is to provide an apparatus for controlling transmission supporting an Automatic Repeat reQuest (ARQ) method, that control transmission priority of a data unit in consideration of transmission priority of a data unit and Quality of Service (QoS).

According to an aspect of the present invention, in order to achieve the above and solve a problem of a conventional art, there is provided an apparatus for controlling transmission including a receiver to receive mobile station status information from a mobile station connected with a base station, a schedule managing unit to determine transmission priority of a plurality of data units to be transmitted to the mobile station based on the received mobile station status information, and a transmitter to transmit the data units to the mobile station based on the determined transmission priority.

According to another aspect of the present invention, there is provided an apparatus for controlling transmission comprising a transmitter to transmit a data unit to a mobile station connected to a base station, and to update final data transmission time information in relation to the mobile station, a data storing unit to store the transmitted data unit, a receiver to receive an Acknowledgement (ACK) message or a Negative Acknowledgement (NACK) message for the transmitted data unit; and a time managing unit to update the data storing unit based on the initial data transmission time information, the ACK message, or the NACK message, According to still another aspect of the present invention, there is provided an apparatus for controlling transmission in a base station supporting a selective-repeat continuous ARQ method, the apparatus comprising a transmitter to transmit a data unit to a mobile station connected to a base station and to update transmission number parameter for the data unit, a data storing unit to store the transmitted data unit, a receiver to receive an ACK message or a NACK message for the transmitted data unit, and a message managing unit to update the data storing unit based on the transmission number parameter, ACK message, or NACK message, wherein the transmitter retransmits a remaining data unit in the data storing unit to the mobile station according to the update of the message managing unit.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 1:
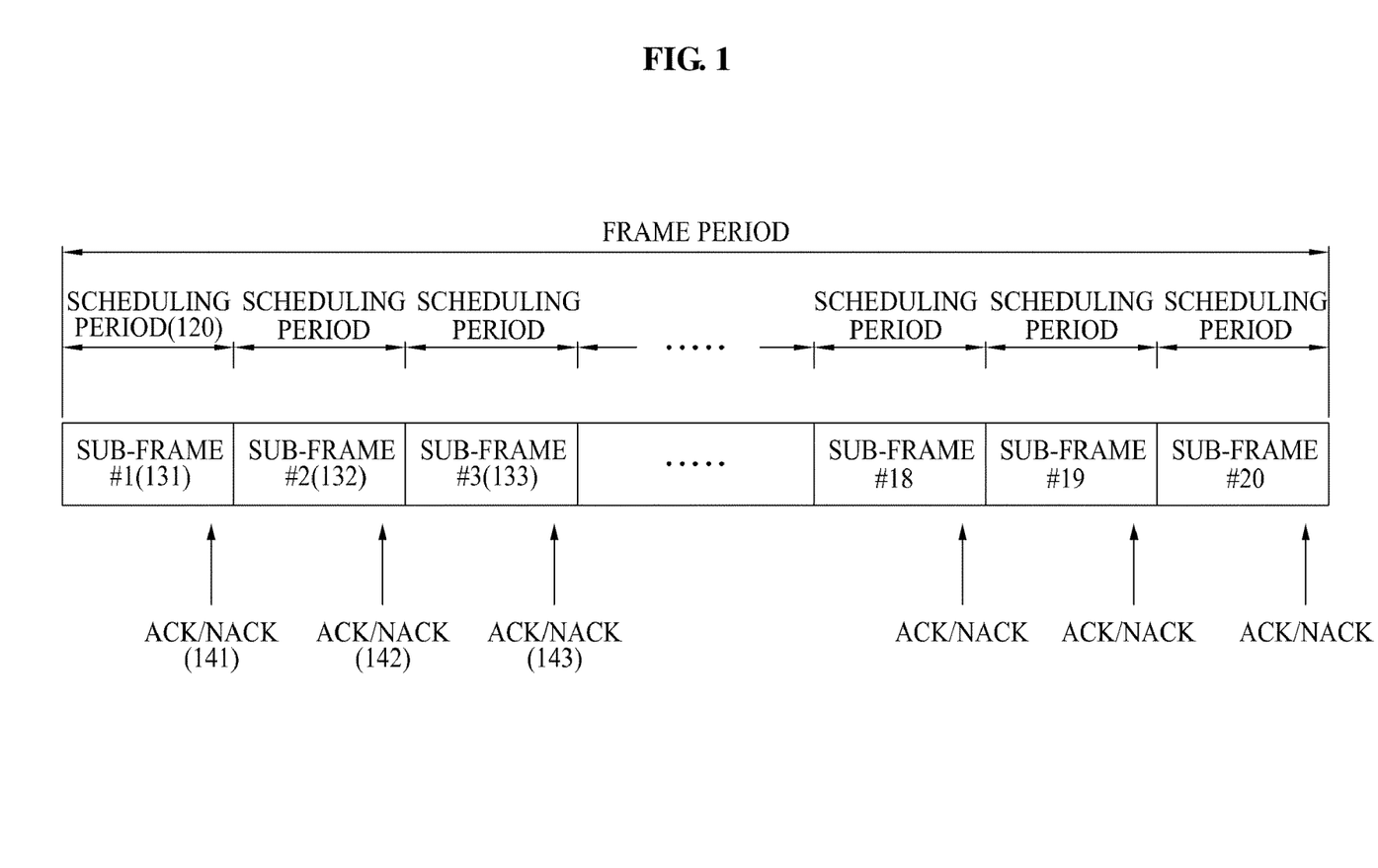
FIG. 1 illustrates relationship between a frame period and a scheduling period according to the present invention.

FIG. 1 illustrates relationship between frame period and scheduling period according to the present invention. The relationship between frame period and scheduling period is described in detail below referring to FIG. 1.

In order to provide a variety of Quality of Service (QoS) having more than 100 Mpb transmission rate under a high-speed mobile environment in the 4$^{th}$ generation communication system that is a next-generation communication system, frame period is getting smaller, each frame is divided into the unit of a sub-frame, and scheduling is performed in the unit of a sub-frame. For example, in Third Generation Partnership Project Long Term Evolution (3GPP LTE) that is a 4$^{th}$ generation communication system, a frame period is 10 ms, each frame includes 20 sub-frames, and the period of each sub-frame is 0.5 ms. A scheduler of a base station performs scheduling in consideration of channel environment of a mobile station, priority of each service, and fairness among users, thus, the scheduler of a base station performs a more complicated calculation than a scheduler of a mobile station.

A transmission controlling apparatus performs scheduling using a plurality of sub-frames 131, 132, and 133 as the unit. That is, length of time of each sub-frame 131, 132, and 133 is a scheduling period 120. The transmission controlling apparatus receives either an ACK message or an NACK message 141, 142, and 143 for the transmitted data unit using sub-frame 131, 132, and 133. The transmission controlling apparatus may recognize success or failure of transmission based on the Acknowledgement (ACK) message or a Negative Acknowledgement (NACK) message. The transmission controlling apparatus may retransmit a data unit in failed transmission to a mobile station. The transmission controlling apparatus may redetermine transmission priority of the data unit in failed transmission. The data unit may be either transmitted or discarded depending on the redetermined transmission priority.

Figure 2:
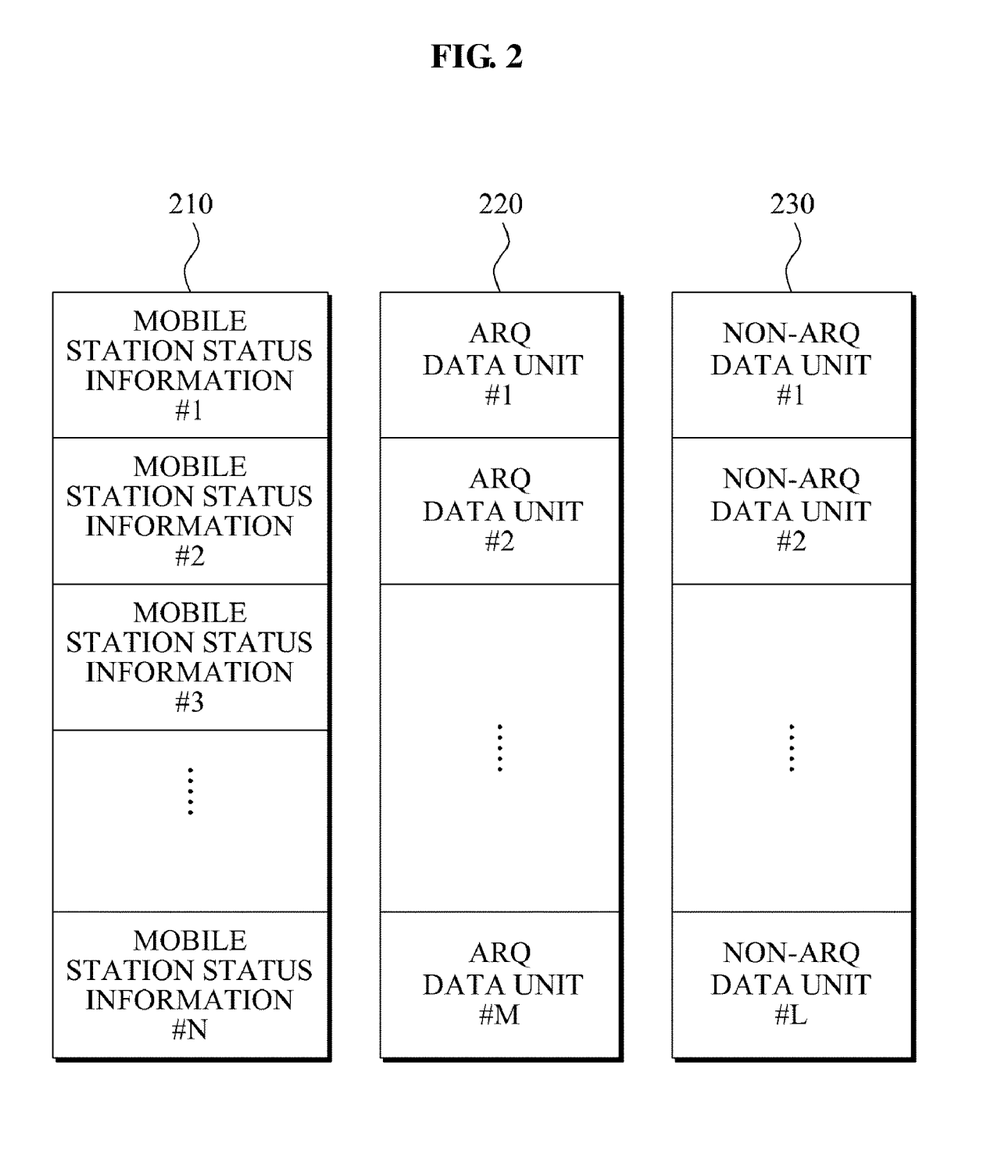
FIG. 2 illustrates mobile station operation information managed by a mobile station managing unit according to an embodiment of the present invention.

FIG. 2 illustrates mobile station operation information managed by a mobile station managing unit according to an embodiment of the present invention. The mobile station operation information is described in detail below referring to FIG. 2.

A transmission controlling apparatus manages a plurality of data units according to a mobile station connected to a base station and a plurality of services used by each mobile station. In order to systematically manage the data units, the transmission controlling apparatus manages the data units according to a service that each mobile station uses.

Mobile station status information 210 is used to manage a mobile station connected to a base station. According to an embodiment of the present invention, a controlling apparatus activates as many mobile station status information arrays as the number of mobile stations connected to a current base station among a plurality of mobile station status information arrays and manages the mobile station status information.

ARQ transmission queue 220 stores data units transmitted through ARQ transmission method among data units transmitted to a mobile station. According to an embodiment of the present invention, a transmission controlling apparatus receives an ACK message for a transmitted data unit from a receiver, and retransmits a data unit that fails to be transmitted to a mobile station.

Non-ARQ transmission queue 230 stores data units that are not transmitted through ARQ transmission method among data units transmitted to a mobile station.

Figure 3:
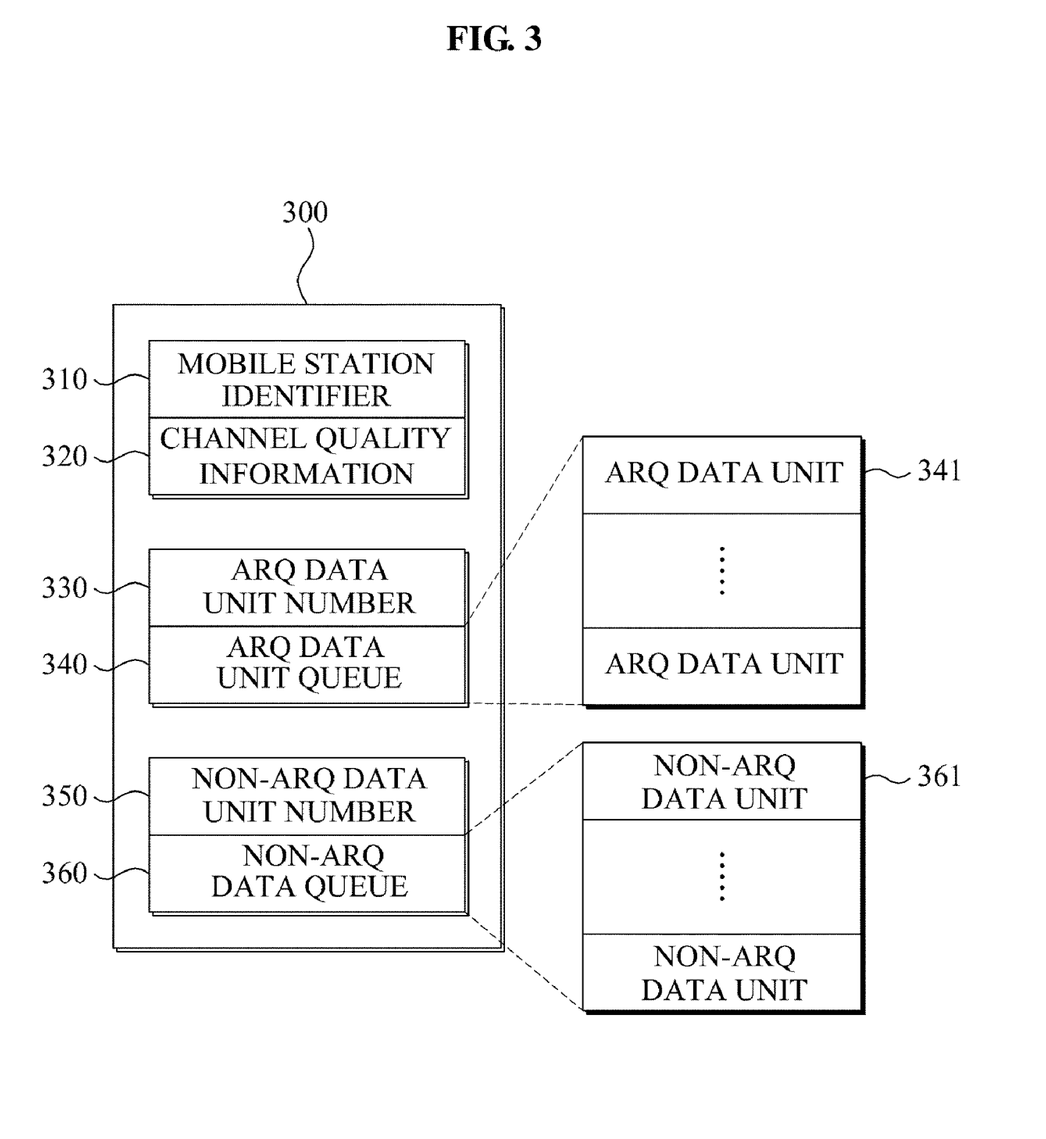
FIG. 3 illustrates mobile station status information according to an embodiment of the present invention.

FIG. 3 illustrates mobile station status information 300 according to an embodiment of the present invention. The mobile station status information 300 is described in detail below referring to FIG. 3. The mobile station status information 300 according to the present invention includes a mobile station identifier 310, channel quality information (CQI) 320, ARQ data unit number 330, ARQ data queue 340, non-ARQ data unit number 350, and non-ARQ data queue 360.

The transmission controlling apparatus may determine transmission priority and expected transmission time of data unit to be transmitted to a mobile station based on the mobile station status information 300.

The mobile station identifier 310 indicates that the mobile station status information 300 corresponds to a particular mobile station. According to an embodiment of the present invention, telephone number assigned to a mobile station, Electric Serial Number (ESN) used in a CDMA mobile communication system, and the like, may be used as the mobile station identifier 310

The channel quality information (CQI) 320 is CQI of wireless link between a mobile station and a base station. According to an embodiment of the present invention, the CQI may include signal to noise and interference ratio (SINR) of wireless link between a mobile station and a base station.

The ARQ data unit number 330 indicates the number of transmitted data units through ARQ transmission method among data units transmitted to a mobile station. The ARQ data queue 340 stores data units transmitted through ARQ transmission method among data units transmitted to a mobile station. According to an embodiment of the present invention, the ARQ data queue 340 may store a plurality of ARQ data unit 341.

The non-ARQ data unit number 350 indicates the number of data unit that are not transmitted through ARQ transmission method among data units transmitted to a mobile station.

The non-ARQ data queue 360 stores data units that are not transmitted through ARQ transmission method among data units transmitted to a mobile station. According to an embodiment of the present invention the non-ARQ data queue 360 may store a plurality of non-ARQ data units 361.

Figure 4:
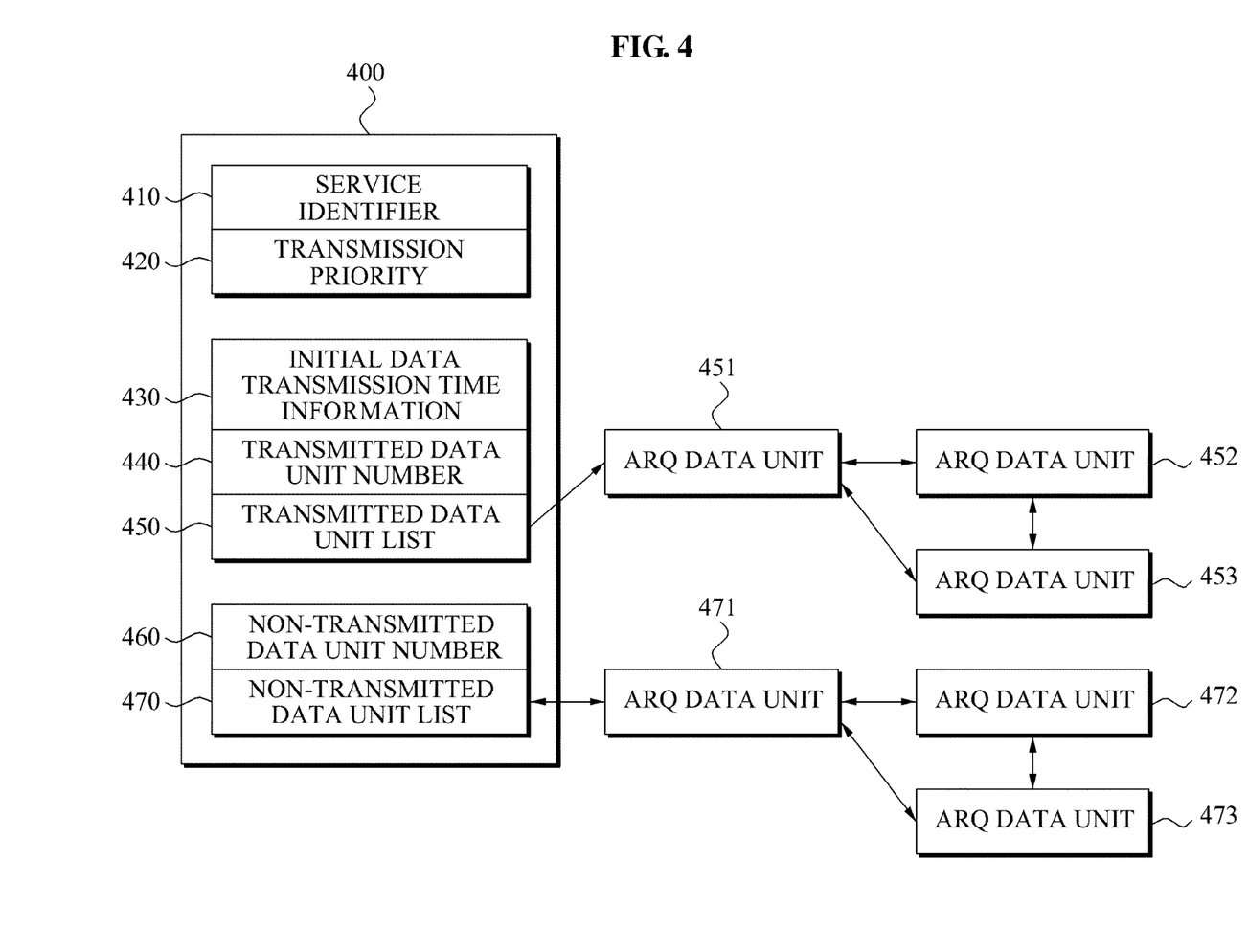
FIG. 4 illustrates ARQ transmission Queue management information according to an embodiment of the present invention.

FIG. 4 illustrates ARQ transmission queue management information 400 according to an embodiment of the present invention. The ARQ transmission queue management information 400 is described in detail below referring to FIG. 4. The ARQ transmission queue management information 400 according to the present invention includes a service identifier 410, transmission priority 420, initial data transmission time information 430, transmitted data unit number 440, transmitted data unit list 450, non-transmitted data unit number 460, and non-transmitted data unit list 470.

A transmission controlling apparatus may manage data unit transmitted through ARQ transmission method among data units transmitted to a mobile station based on ARQ transmission queue management information.

The service identifier 410 is to identify service in relation to ARQ transmission queue among a plurality of data services used by a mobile station.

The transmission priority 420 is transmission priority of a data unit transmitted by a mobile station. In particular, according to an embodiment of the present invention, a transmission controlling apparatus may either redetermine transmission priority of data service related to a data unit or redetermine transmission priority of a specific data unit and schedule the specific data unit. According to an embodiment of the present invention, transmission priority of data service used by a mobile station is determined based on QoS of the data service.

Initial data transmission time information 430 indicates initial transmission time of data unit that is first transmitted among data units stored in ARQ transmission queue. A transmission controlling apparatus may compare a difference between the initial data transmission time and present time with retransmission time limit, may not transmit data stored in ARQ transmission queue, and may delete the stored data from the ARQ transmission queue.

Transmitted data unit number 440 indicates the number of data units transmitted to a mobile station through ARQ transmission method among data units stored in the ARQ transmission queue 400. There is no need to store the number of data units that are not transmitted through ARQ transmission method because the data units not transmitted through ARQ transmission method are not to be retransmitted, Transmitted data unit list 450 indicates list of data units transmitted to a mobile station through ARQ transmission method among data units stored in the ARQ transmission queue 400. According to an embodiment of the present invention, the transmitted data unit list 450 may includes a data unit 451, 452, and 453 transmitted to a mobile station through ARQ transmission method.

The non-transmitted data unit number 460 indicates the number of data units to be transmitted through ARQ transmission method among data units that are not yet transmitted to a mobile station.

The non-transmitted data unit list 470 indicates a list of data units 471, 472, and 473 to be transmitted through ARQ transmission method among data units that are not yet transmitted to a mobile station.

Figure 5:
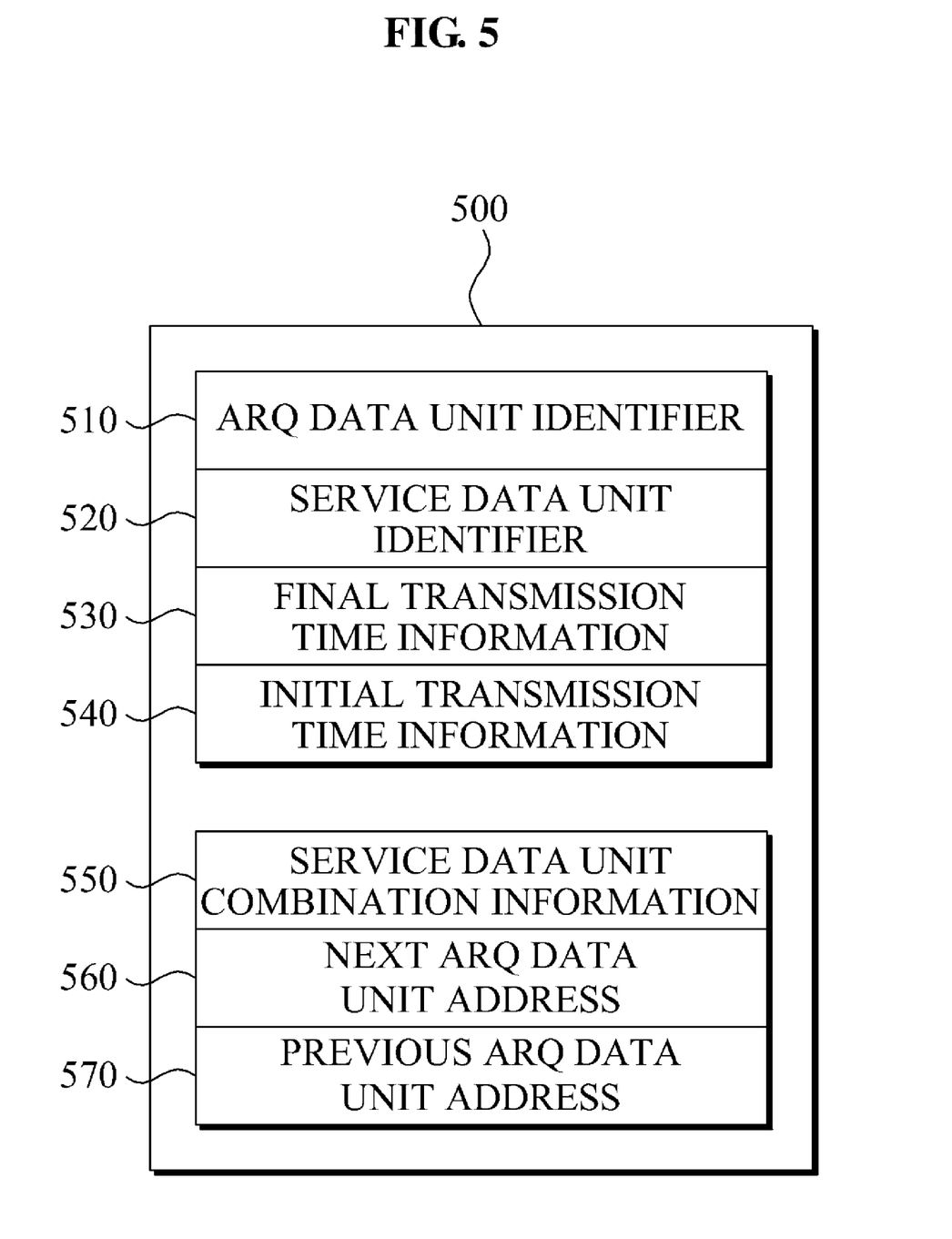
FIG. 5 illustrates ARQ block management information according to an embodiment of the present invention.

FIG. 5 illustrates ARQ block management information 500 according to an embodiment of the present invention. The ARQ block management information is described in detail below referring to FIG. 5. The ARQ block management information 500 according to the present invention includes an ARQ data unit identifier 510, a service data unit identifier 520, final transmission time information 530, initial transmission time information 540, service data unit combination information 550, next ARQ data unit address 560, and previous ARQ data unit address 570.

The ARQ data unit identifier 510 is to identify each ARQ data unit.

A transmission controlling apparatus transmits respectively different kind of service data unit (SDU) according to service used by a mobile station. SDU transmitted by a base station has different size according to a kind of service. In order to easily transmit SDU to a mobile station, the transmission controlling apparatus may divide the SDU and generate an ARQ data unit. In order to enable the transmission controlling apparatus to easily transmit data to a mobile station, an ARQ data unit has predetermined size. The SDU identifier 520 is to identify from which SDU unit an ARQ data unit is generated. A mobile station that receives an ARQ data unit may recombine a service data unit from an ARQ data unit using the SDU identifier.

The final transmission time information 530 indicates final transmission time of an ARQ data unit to a mobile station.

The initial transmission time information 540 indicates initial transmission time of an ARQ data unit to a mobile station. Although the initial transmission time information 540 and the final transmission time information 530 is identical, when an ARQ data unit is initially transmitted, the final transmission time information 530 is updated according to retransmission of the ARQ data unit to a mobile station.

A transmission controlling apparatus may compare the initial transmission time information 540, the final transmission time information 530, and retransmission time limit, and may determine whether to retransmit an ARQ data unit to a mobile station.

The service data unit combination information 550 is needed information for combining an ARQ data unit and generating a service data unit.

The ARQ data unit according to the present invention may be linked together using doubly-linked list. The ARQ data units linked by a doubly-linked list may be easily managed even when any of the ARQ data units is deleted.

The next ARQ data unit address 560 indicates ARQ data unit address linked next to a corresponding ARQ data unit in a doubly-linked list.

The previous ARQ data unit address 570 indicates ARQ data unit address linked previous to a corresponding ARQ data unit in a doubly-linked list.

Figure 6:
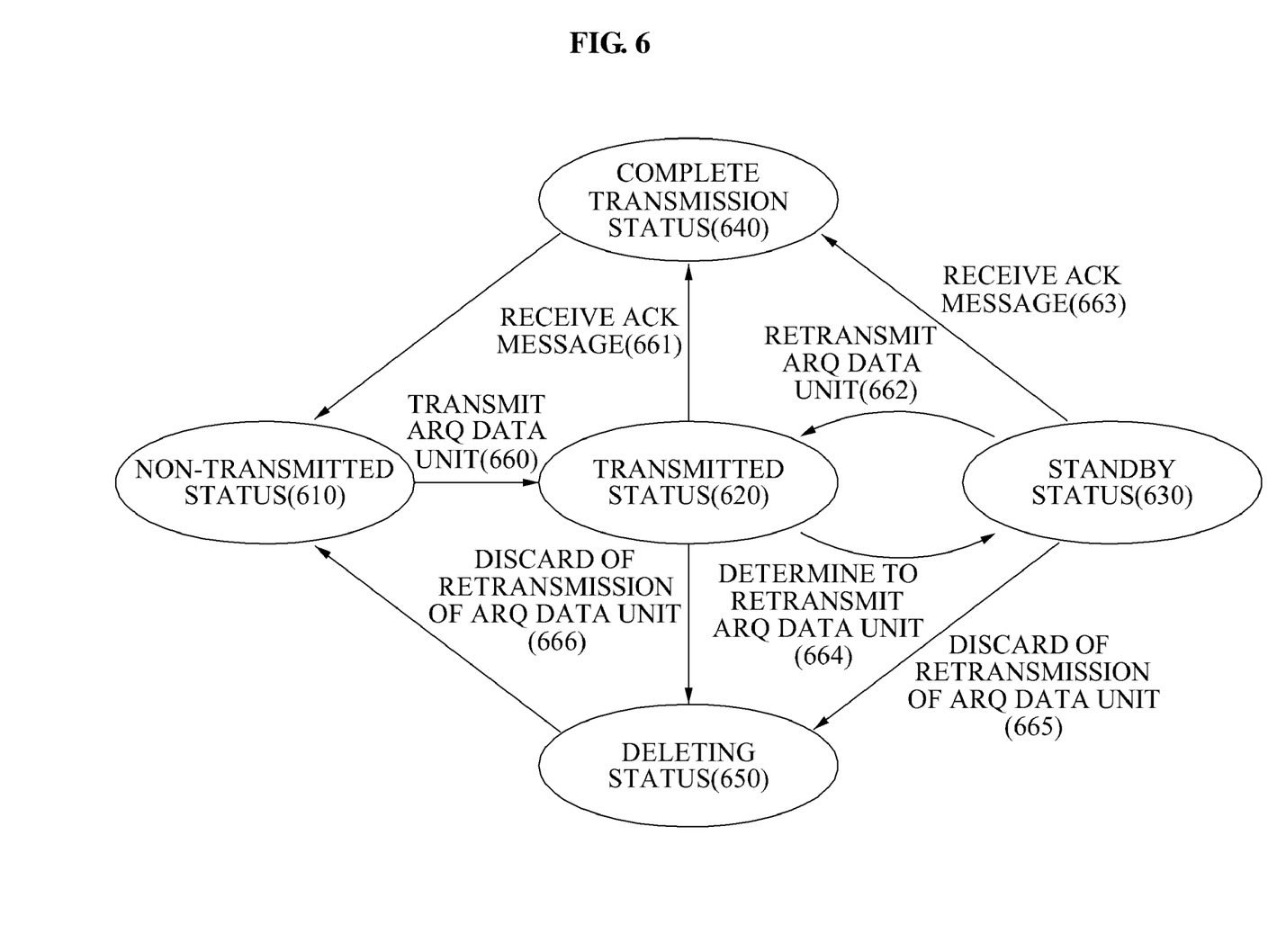
FIG. 6 illustrates state transition diagram of an ARQ data unit according to an embodiment of the present invention.

FIG. 6 illustrates state transition diagram of an ARQ data unit according to an embodiment of the present invention. The status transition diagram of an ARQ data unit is described in detail as below referring to FIG. 6.

Non-transmitted status 610 indicates status of an ARQ data unit not yet transmitted to a mobile station among ARQ data units to be transmitted. A transmission controlling apparatus determines both transmission priority according to service related to a non-transmitted ARQ data unit and expected transmission time of an ARQ data unit based on the determined transmission priority. Upon transmitting an ARQ data unit 660, status is transited from non-transmitted status 610 to transmitted status 620.

Transmitted status 620 indicates status that a transmission controlling apparatus has already transmitted an ARQ data unit to a mobile station. In particular, the transmission controlling apparatus has not yet received either an ACK message or an NACK message.

Complete transmission status 640 indicates status that successful transmission of an ARQ data unit to a mobile station is acknowledged. When a transmission controlling apparatus receives an ACK message for an ARQ data unit in operation 661, status of an ARQ data unit is transited from transmitted status 260 to complete transmission status.

Standby status 630 indicates status that an ARQ data unit that fails to be transmitted is on standby until expected retransmission time. Upon receiving an ACK message in operation 663, status of an ARQ unit is transited from standby status 630 to complete transmission status 640. Also, upon retransmitting an ARQ data unit in operation 662, status of the ARQ data unit is transited to transmitted status.

When a transmission controlling apparatus either receives an NACK message for an ARQ data unit in transmitted status 620 or determines to retransmit an ARQ data unit that fails to be transmitted in operation 664, status of an ARQ data unit may be transited to standby status 630 until retransmission time.

Deleting status 650 indicates status of discard of retransmission of an ARQ data unit in operation 665 and 666. A transmission controlling apparatus may discard retransmission of an ARQ data unit that fails to be transmitted due to transmission number limit or transmission time limit. When a transmission controlling apparatus discards retransmission, the transmission controlling apparatus deletes an ARQ data unit that fails to be transmitted.

Figure 7:
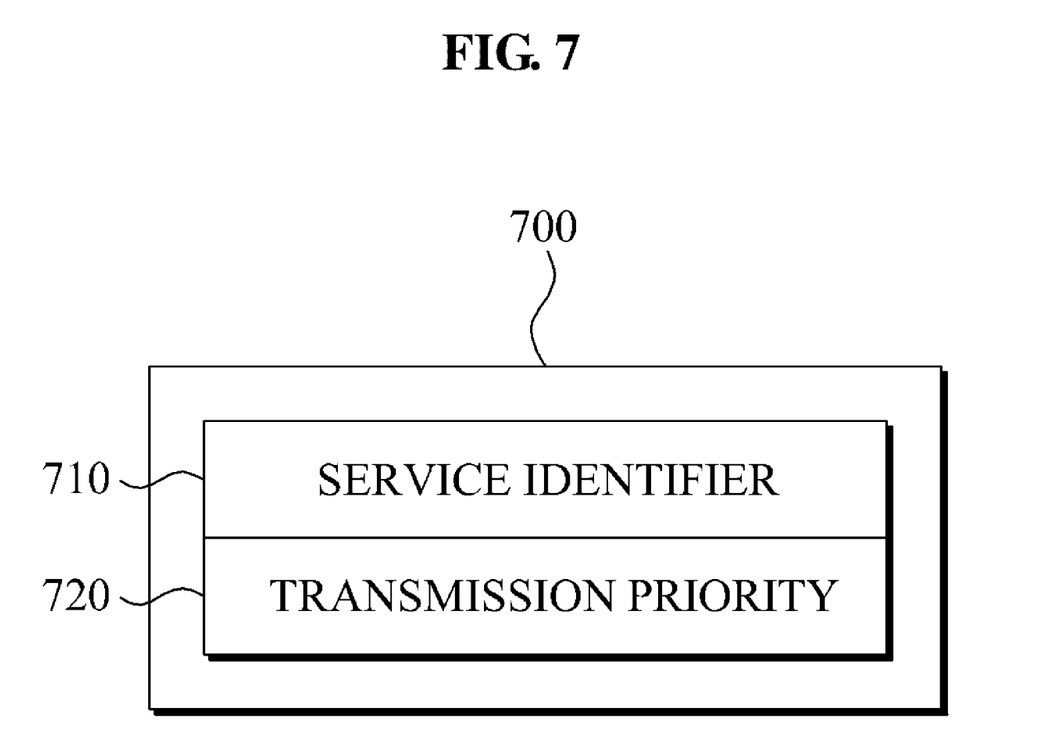
FIG. 7 illustrates non-ARQ transmission queue management information according to an embodiment of the present invention.

FIG. 7 illustrates non-ARQ transmission queue management information 700 according to an embodiment of the present invention. The non-ARQ transmission queue management information 700 is described in detail below referring to FIG. 7. The non-ARQ transmission queue management information 700 according to the present invention includes a service identifier 710 and transmission priority 720.

The service identifier is to identify service related to a non-ARQ service among a plurality of data service used by a mobile station.

The transmission priority 720 is transmission priority of data service used by a mobile station. In particular, according to an embodiment of the present invention, a transmission controlling apparatus may redetermine transmission priority in relation to a data unit so as to schedule a data unit.

In the non ARQ transmission queue, data units that are not transmitted through ARQ transmission method among data units to be transmitted to a mobile station are stored. When the ARQ transmission method is not used, a transmission controlling apparatus neither receives an ACK or an NACK for a transmitted data unit nor redetermines data unit that fails to be transmitted, thus, there is no need of storing information for retransmission.

Figure 8:
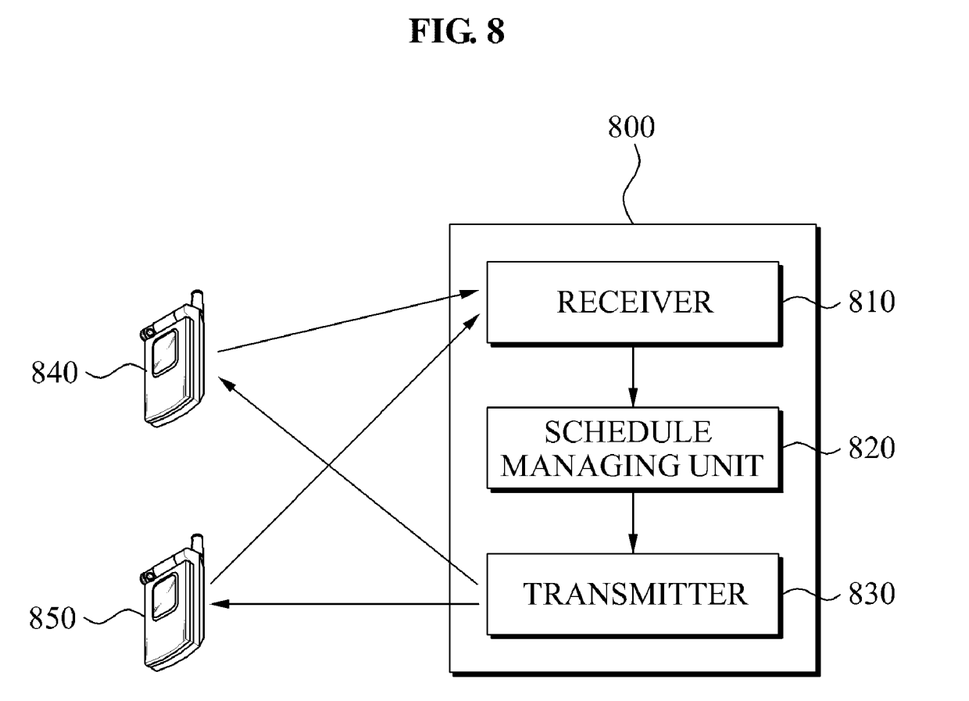
FIG. 8 is a block diagram illustrating a structure of a transmission controlling apparatus according to an embodiment of the present invention.

FIG. 8 is a block diagram illustrating a structure of a transmission controlling apparatus 800 according to an embodiment of the present invention. The structure of a transmission controlling apparatus 800 is described in detail below referring to FIG. 8. The controlling apparatus 800 includes a receiver 810, a schedule managing unit 820, and transmitter 830.

The receiver 810 receives mobile station status information from a mobile station 840 and 850 connected to a base station. The mobile station status information according to an embodiment of the present invention may include signal to interference and noise ratio (SINR) for wireless link between a mobile station and a base station.

The schedule managing unit 820 determines transmission priority of a plurality of data units to transmit to the mobile station 840 and 850 based on the mobile station status information received in the receiver. The scheduling managing unit according to an embodiment of the present invention may determine high transmission priority for a data unit to be transmitted to the mobile station 840 having superior mobile station status information and may determine low transmission priority for a data unit to be transmitted to the mobile station 850 having inferior mobile station status information.

The transmitter 830 transmits data units to a mobile station based on the transmitted determined priority. The transmitter 830 according to an embodiment of the present invention may preferentially transmit a data unit of high transmission priority, and upon finishing transmission of the data unit of high transmission priority, the transmitter 830 may transmit a data unit of low transmission priority.

According to an embodiment of the present invention, the receiver 810 may receive an NACK message from the mobile station 840 and 850, the schedule managing unit 820 may identify a data unit corresponding to the NACK message and determine not to transmit the identified data unit. When a data unit that fails to be transmitted is a data unit related to real-time transmission, a data unit that is delayed to be transmitted for more than a predetermined time is no more needed by the mobile station 840 and 850. Therefore, the schedule managing unit 820 may calculate retransmission time based on a determined transmission priority. When calculated retransmission time is later than retransmission time limit from an initial transmission time of the identified data unit, the schedule managing unit 820 may determine the transmission priority so that the retransmission time is earlier than the retransmission time limit from initial transmission time of the identified data unit.

According to an embodiment of the present invention, the receiver 810 may receive an NACK message for a transmitted data unit from the mobile station 840 and 850, and the schedule managing unit 820 may identify data unit corresponding to the NACK message. The schedule managing unit 820 may redetermine transmission priority for the identified data unit, the transmitter 830 may retransmit the identified data unit to the mobile station 840 and 850 based on the redetermined transmission priority. When calculated retransmission time is more than retransmission time limit from initial transmission time of the identified data unit, the schedule managing unit 820 may redetermine transmission priority so that the retransmission time for the identified data unit does not exceed the retransmission time limit from initial transmission time.

According to an embodiment of the present invention, the transmitter 830 may change a modulation or a coding scheme for a data unit. According to an embodiment of the present invention, the transmitter 830 may determine a modulation or coding scheme to transmit a data unit to the mobile station 840 having superior mobile station status information in a modulation or coding scheme in relation to high transmission rate.

Figure 9:
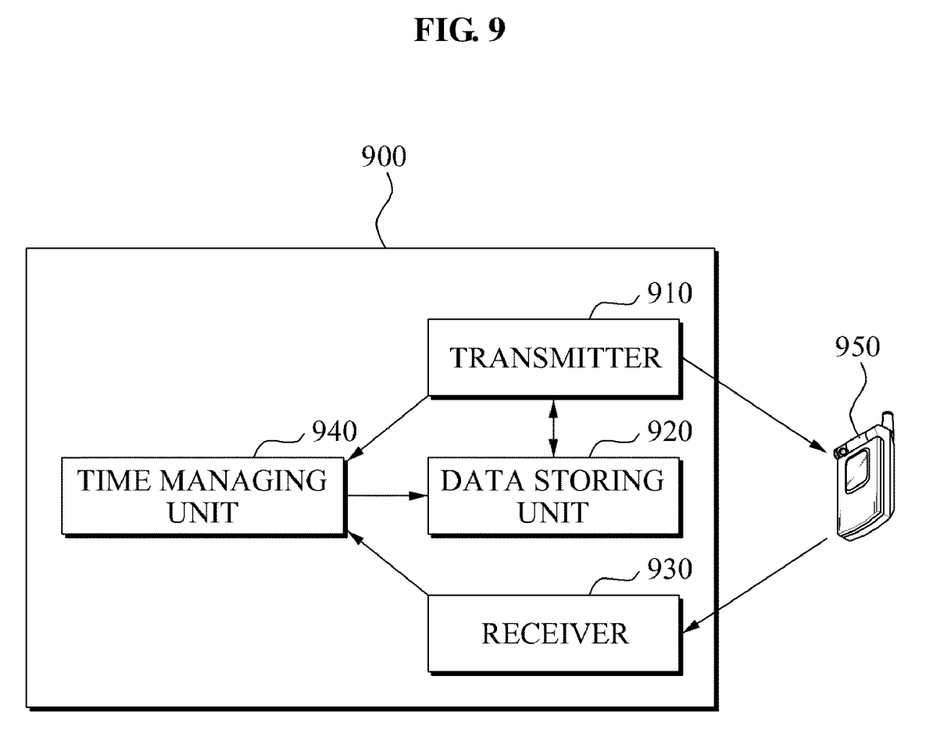
FIG. 9 is a block diagram illustrating a structure of a transmission controlling apparatus according to another embodiment of the present invention.

FIG. 9 is a block diagram illustrating a structure of a transmission controlling apparatus 900 according to another embodiment of the present invention. The structure of a transmission controlling apparatus 900 is described in detail below referring to FIG. 9. The transmission controlling apparatus 900 includes a transmitter 910, a data storing unit 920, a receiver 930, and a time managing unit 940.

The transmitter 910 transmits a data unit to a mobile station 950 connected to a base station and updates initial transmission time related to the mobile station 950.

The data storing unit 920 stores the data unit transmitted to the mobile station 950.

The initial data transmission time information updated by the transmitter 910 is initial transmission time information of a data unit among data units stored in the data storing unit 920.

The receiver 930 receives an ACK message or an NACK message for a transmitted data unit from the mobile station 950.

The time managing unit 940 updates the data storing unit 920 based on initial data transmission time information, an ACK message, or an NACK message. According to an embodiment of the present invention, when the receiver 920 receives an ACK message, the time managing unit 940 may identify a data unit corresponding ACK message. The time managing unit 940 may delete a data unit corresponding to the ACK message from the data storing unit 920, thereby updating the data storing unit.

The transmitter 910 transmits remaining data unit in a data storing unit according to the update of the time managing unit.

According to an embodiment of the present invention, when the receiver 930 receives an NACK message, the time managing unit 940 identifies a data unit corresponding to the NACK message, wherein the identified data unit is a data unit that fails to be transmitted. The time managing unit 940 may update a data storing unit based on initial transmission information for the mobile station 950, present time information, and a predetermined time limit.

According to an embodiment of the present invention, when a time from initial transmission time to present time does not exceed a predetermined retransmission time limit, all data units transmitted to the mobile station 950 may be retransmitted to the mobile station 950. That is, the data units are not deleted from the data storing unit 920.

According to an embodiment of the present invention, when a time from initial transmission time information to present time is more than retransmission time limit, partial data units among data units transmitted to the mobile station 950 are not retransmitted to the mobile station 950. That is, the time managing unit 940 may delete partial units from among data units stored in the data storing unit 920, thereby updating the data storing unit 920.

According to an embodiment of the present invention, the time managing unit 920 may redetermine transmission priority of undeleted data units. According to an embodiment of the present invention, the time managing unit 920 may redetermine transmission priority of the undeleted data units to be high transmission priority.

According to an embodiment of the present invention, when the receiver 930 receives an NACK message, the time managing unit 940 may calculate an expected time for retransmission of a transmitted data unit and compare the calculated predetermined time for retransmission with initial data transmission. When a time from initial data transmission time to an expected time for retransmission is more than a predetermined time limit, the time managing unit 940 may determine not to retransmit the transmitted data unit. The time managing unit 940 may delete the transmitted data unit from the data storing unit 920. According to an embodiment of the present invention, the time managing unit 940 may redetermine transmission priority for the data unit that is determined to be transmitted. According to an embodiment of the present invention, the time managing 920 may redetermine transmission priority of undeleted data unit to be high transmission priority.

Figure 10:
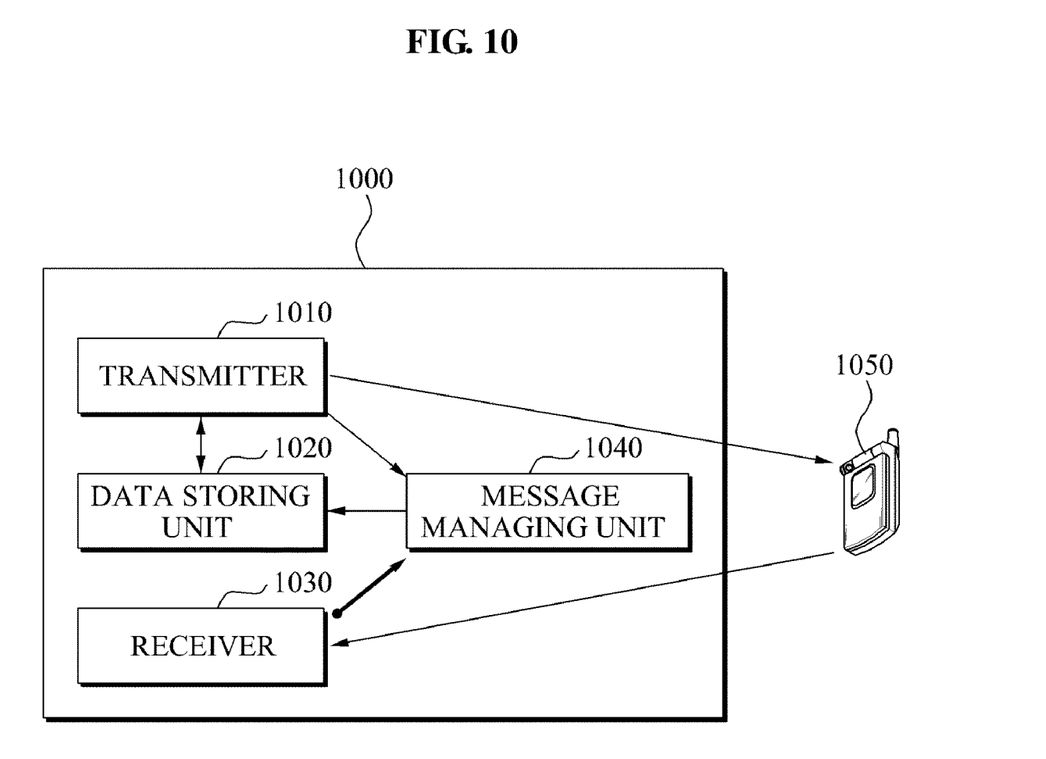
FIG. 10 is a block diagram illustrating a structure of a transmission controlling apparatus according to still another embodiment of the present invention.

FIG. 10 is a block diagram illustrating a structure of a transmission controlling apparatus 1000 according to still another embodiment of the present invention. The structure of a transmission controlling apparatus 1000 is described in detail below referring to FIG. 10. The transmission controlling apparatus 1000 according to the present invention includes a transmitter 1010, a storing unit 1020, a receiver 1030, and a message managing unit 1040.

The transmitter 1010 transmits a data unit to the mobile station 1050 connected to a base station and updates transmission number parameter for the transmitted data. The transmission controlling apparatus according to the present invention may receive an NACK message for the transmitted data and retransmit data in response to the received NACK message, wherein the transmission number parameter indicates the number of transmission of data units to the mobile station 1050.

The data storing unit 1020 stores a transmitted data unit.

The receiver 1030 receives an ACK message or NACK message for a transmitted data unit.

The message managing unit 1040 updates a data storing unit based on transmission number parameter, an ACK message, or an NACK message.

The transmitter 1010 retransmits a remaining data unit in a data storing unit to the mobile station 1050 according to update of the message managing unit 1040.

According to an embodiment of the present invention, an ACK message may include an identifier of a data unit corresponding to the ACK message and information for success of transmission of the data unit.

According to an embodiment of the present invention, an NACK message may include an identifier of a data unit corresponding to the NACK message and information for failure of transmission of the data unit.

According to an embodiment of the present invention, when the receiver 1030 receives an NACK message, the message managing unit 1040 may compare a transmission number parameter for a data unit corresponding to the NACK with a predetermined retransmission threshold. The message managing unit 1040 may update the data storing unit 1020 according to the comparison result.

According to an embodiment of the present invention, when transmission number parameter is equal to/more than a predetermined retransmission threshold, the message managing unit 1040 may delete a data unit corresponding to the NACK message, thereby updating the data storing unit 1020.

According to an embodiment of the present invention, when transmission number parameter is less than a predetermined retransmission threshold, a schedule managing unit may redetermine transmission priority for a data unit corresponding to a NACK message. According to an embodiment of the present invention, the schedule managing unit may redetermine transmission priority of an undeleted data unit to be high transmission priority.

According to the present invention, a base station supporting ARQ transmission method may control transmission priority of a data unit in consideration of transmission priority and QoS of the data unit.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for controlling transmission, comprising:
    a receiver configured to receive mobile station status information from a mobile station connected with a base station;
    a schedule managing unit configured to determine transmission priority of a plurality of data units to be transmitted to the mobile station based on the received mobile station status information; and
    a transmitter configured to transmit the data units to the mobile station based on the determined transmission priority,
    wherein the receiver receives a first Negative Acknowledgement (NACK) message from the mobile station, the schedule managing unit identifies a first data unit corresponding to the first NACK message and redetermines transmission priority of the identified first data unit, and the transmitter retransmits the identified first data unit to the mobile station based on the redetermined transmission priority.

2. The apparatus of claim 1, wherein the receiver receives a second NACK message from the mobile station, and the schedule managing unit identifies a second data unit corresponding to the second NACK message and determines not to retransmit the identified second data unit.

3. The apparatus of claim 1, wherein the transmitter changes a modulation scheme or a coding scheme with respect to one of the data units based on the received mobile station status information.

4. The apparatus of claim 1, wherein the mobile station status information includes Signal to Interference and Noise Ratio (SINR) with respect to a radio link between the mobile station and the base station.

* * * * *